June 26, 1962     R. C. DAY     3,041,102
FROG GRAPPLING IMPLEMENT
Filed Feb. 19, 1960
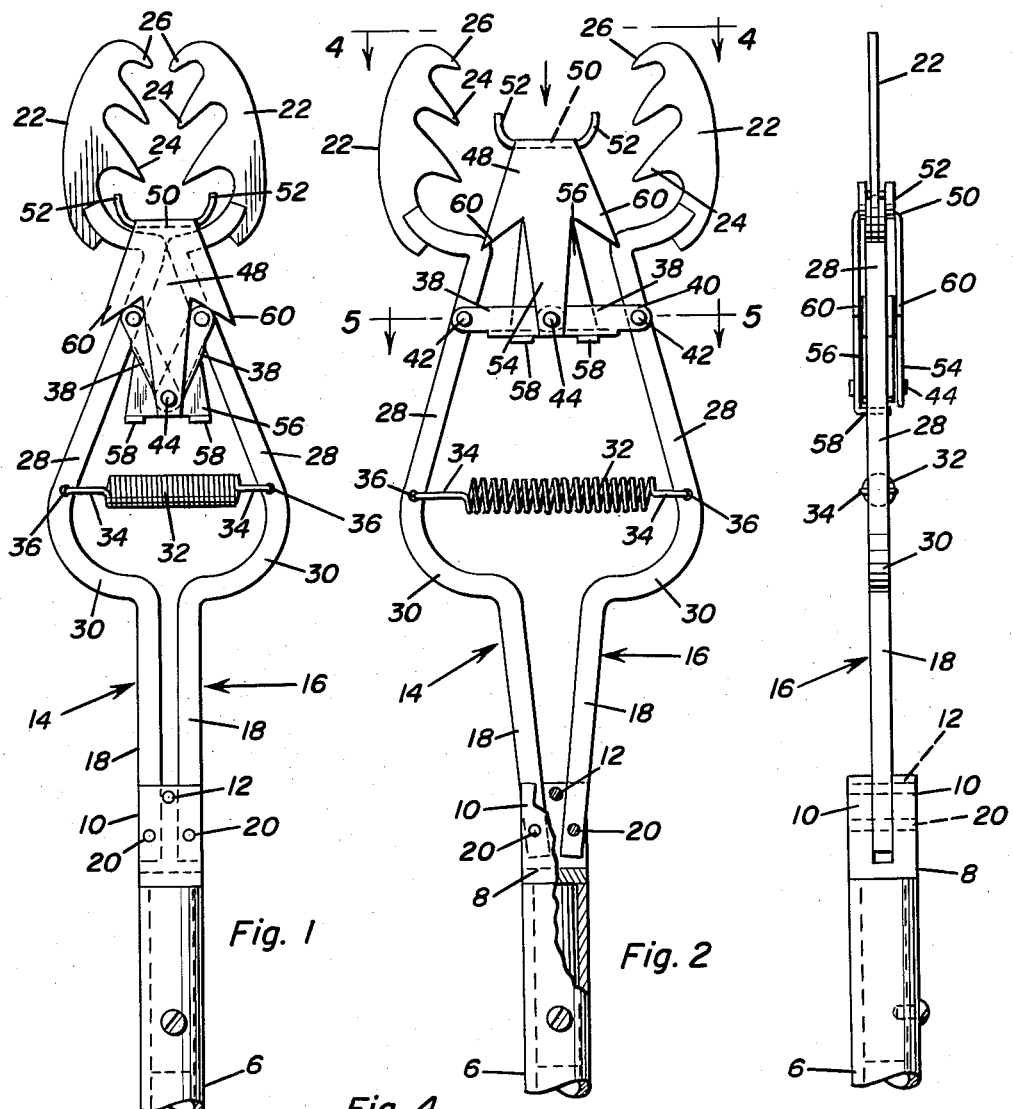
Robert C. Day
INVENTOR.
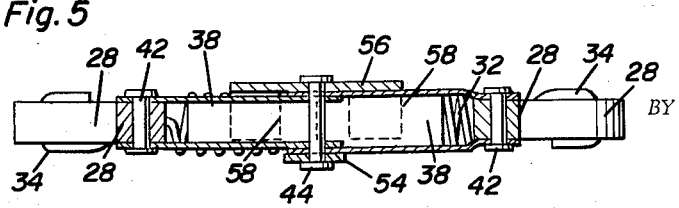

United States Patent Office 3,041,102
Patented June 26, 1962

3,041,102
FROG GRAPPLING IMPLEMENT
Robert C. Day, 1606 Main St., Baker, La.
Filed Feb. 19, 1960, Ser. No. 9,948
4 Claims. (Cl. 294—110)

The present invention relates to certain new and useful improvements in a structurally and functionally distinct mechanical implement characterized by spring-loaded animal gripping jaws and novel animal actuated trigger means which is unique in construction and coacts with the complemental jaws in an unusual manner.

Briefly summarized, the jaws are constructed and suitably designed for successfully and effectually grappling the prey (frogs, snakes and the like), said jaws providing the desired grab action, and being fixed at the outer end portions of specially designed arms hingedly mounted on the outer end of an appropriate handle. These arms are connected by a coil spring which, when the implement is set, is under tension. The trigger mechanism comprises toggle links hinged together and also hingedly connected to median portions of the jaw-equipped arms. A novel trip is pivotally connected to the hinged inner ends of the toggle links and this trip has specifically distinct features to be hereinafter set forth.

With the construction devised and, as experience has repeatedly shown, the animal to be caught is substantially confined within the limits of the jaws before the trigger mechanism may be activated. Moreover, the trigger mechanism is rapid in its action.

Another improvement resides in so constructing the pressure released trip, a part of the trigger mechanism, that it is efficiently cooperable with the jaws when the jaws are in cocked position, the construction being such that the set implement will not be accidentally tripped on brush or the like.

Generally stated, the improved implement is characterized by such prerequisites as simplicity, speedy operation, compactness and convenience, and a combination of parts which takes into account matters of legality in respect to certain State laws (Louisiana, for example). To this end simplicity is attained in that no complex and intricate structural details are present to cause fouling because of the likelihood of the implement being clogged by mud or trash.

With respect to rapid action and speed, the construction of the components in the trigger mechanism and the associated parts results in the jaws being triggered almost instantly. This result is attributed to the precise shape of the arms and other parts.

In respect to compactness, it is to be remembered that the frog hunter is often faced with a situation where he must catch the frog in a restricted place which may also be difficult of access. To this end, the invention is such that the jaw-equipped arms are so constructed and pivotally mounted on the handle that the jaws need not be opened any more than is absolutely necessary to make a satisfactory catch.

Then, too, in many states it is against the law to catch a frog with an implement that will "puncture the skin or bruise the meat" and inasmuch as the present implement has been made and successfully used it has been found to be such as to comply with the laws of the State of Louisiana and perhaps other states too.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a view in side elevation of a frog grappling implement constructed in accordance with the invention and showing the jaws closed and the trigger mechanism sprung or retracted;

FIG. 2 is a view based on FIG. 1 with parts appearing in section and which is employed primarily to show the relationship of the component parts with the jaws open and the implement set to make a catch;

FIG. 3 is an edge elevation;

FIG. 4 is a top view which might be called a top edge view which is viewed on the line 4—4 of FIG. 2 looking in the direction of the indicating arrows; and, FIG. 5 is a view on an enlarged scale taken on the plane of the line 5—5 of FIG. 2.

Referring now to the drawing, the handle (also called a reach pole) which may be tubular and of any length and suitable material, is denoted by the numeral 6. A suitable metal or equivalent adapter is provided at the outer end thereof and comprises a generally rectangular block-like head 8 which is bifurcated to provide a pair of spaced furcations 10 with a pin 12 extending therethrough. The jaw-equipped arms which are duplicates of one another, are denoted by the numerals 14 and 16. The description of one will suffice for both. Each arm in actual practice is about ten inches more-or-less in length and is made from a suitably bent iron bar or equivalent stock which is rectangular in cross section. The inner end portions of the arms (which may also be called attaching shanks) are straight, coplanar and are denoted at 18 and these have their terminals arranged between the furcations and pivoted or hinged in place at 20. The outer end portions of said arms converge and are provided with rigid coplanar extensions formed along cooperating inner lengthwise edges with opposed cooperating teeth and providing a pair of jaws 22 adapted to be moved toward and from each other in conjunction with the movement of the arms carrying said jaws. Each jaw is a flat segmental plate with the inner edge provided with frog grappling teeth 24. The outer teeth, that is, at the outer free ends of the jaws, are toed in toward each other as at 26. The intermediate portions of the arms in their normal or set position converge outwardly and toward each other, these convergent portions being denoted at 28. The curvate junctional portions between the convergent portions and the shank portions are suitably curved bends 30. A strong coil spring 32 is interposed between the convergent portions 28 and has hooked ends 34 anchored in the anchoring and retaining holes 36.

The trigger mechanism comprises toggle means which, more specifically, comprises a pair of duplicate companion toggle links 38 which are channel-shaped in cross section. The outer ears 40 straddle the median portions of the arms 28 and are pivotally connected thereto at 42. The flanged inner end portions are hinged together at 44. The trip is a part of unusual construction and is preferably constructed from sheet metal or the like which is bent upon itself between its ends to provide a pair of spaced parallel plate members 48. The portion connecting the plate members together, and which may be described as a web, is denoted by the numeral 50 and this is the surface which is normally contacted by the potential victim and it will be noticed that it is provided at its ends with upstanding terminal portions 52 having suitable notches. These notches are perhaps better shown in FIG. 4. The front plate 48 seen at the left (FIGS. 1 and 2) has a toggle actuating finger 54 connected with the aforementioned hinge 44 at the lower end. The rear plate 48 has a similar but structurally distinct extension forming a finger 56. This particular finger is wider than the finger 54 and it cooperates with the adjacent side of the toggle links and is also connected to the same hinge or pivot pin 44. By being wider this finger is provided with a pair of laterally bent members or lugs 58 serving as finger-pieces and which extend laterally in relation to the web portion of the channel-like toggle links 38. The median marginal edge portions of both plates are provided with outstanding V-shaped guards 60 which straddle the arm portions 28 and assist in lining up and stabilizing the action of the jaw-equipped arms.

The expression "finger-pieces" has been used above because actually these finger-pieces 58 come into play in setting the implement. By the same token the fingers 54 and 56 which straddle and operate with nicety in relation to the toggle links not only trip the toggle links but also exert pressure on the toggle links in spreading the arm portions 28 apart in what is believed to be an obvious manner by comparing FIGS. 1 and 2. As already stated, the jaws are closed and they are held closed under the action of the coil spring as depicted in FIG. 1 at which time the toggle means is folded or collapsed. Obviously, by exerting pressure on the inner hingedly connected end portions 44 of the links 38 the links can be straightened out and moved to the desired position slightly beyond dead-center in order to thus utilize the toggle means in setting the trigger mechanism. Briefly, the frog grab or grapple is operated in this way. First, the user should place the hands, that is, both hands, in a position which may be visualized as with the forefingers on the top portions 26 of the jaws and thumbs on the lugs or finger-pieces 58. Now, concurrently by exerting outward pressure with the forefingers to spread the jaws apart and upper pressure with the thumbs and by continuing these pressures until the trigger locks in cocked position the implement is ready and set to function as seen in FIG. 2. With the device thus set sharp pressure on the trigger surface 50 will cause the jaws to quickly close in trapping the frog or other victim between the coacting teeth of the jaws 22.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A grappling implement comprising a pair of elongated arms, a handle having an outer end portion, said arms having inner end portions hingedly connected with the outer end portion of said handle, said inner end portions being straight lengthwise and coplanar and capable of assuming close spaced parallel relationship when in a predetermined position and relationship, the median portions of said arms being bent laterally and outwardly and the outer end portions of said arms converging and having terminal outer end portions opposed to and adapted to abut each other and being provided with opposed coplanar extensions, said extensions having opposed inward edge portions provided with cooperating teeth and defining a pair of jaws movable toward and from each other, a coil spring located between median portions of the converging portions of said arms and having ends secured thereto, a toggle embodying a pair of links having inner ends end-to-end adapted to abut each other and hingedly joined and having outer ends hingedly joined to the converging ends of said arms, said links being disposed inwardly of the abutting ends of said converging portions, and an animal actuated trip embodying substantially flat spaced plate portions having parts thereof constantly straddling and cooperating with said converging abutting end portions, outer ends of said plate portions being joined by a web and said web constituting an animal triggering contact surface, said web being confined for operation in an existing space between the jaws when the jaws are either open or closed, and said jaws having free outer end portions projecting at all times beyond the position of said web.

2. The structure defined in claim 1 and wherein said plate portions have V-shaped extensions straddling the abutting portions as well as adjacent converging ends of said arms, said plate portions having spaced parallel fingers connected to the hingedly connected inner ends of the toggle links.

3. The structure defined in claim 2 wherein one of said fingers terminates in laterally bent pressure exerting lugs which facilitate the step of safely pressing the jaws apart and setting the trip with a view toward making a catch.

4. A grappling implement for grabbing and catching frogs and the like comprising a handle having an outer end portion, a pair of elongated duplicate arms, said arms having inner end portions which are linearly straight and which have terminal portions hingedly connected to the outer end of said handle and capable of assuming close spaced parallel relationship and also adapted to be swung apart in outwardly diverging relationship, the median portions of said arms being bent and curved outwardly and the outer end portions of said arms converging and being provided with rigid coplanar extensions formed along cooperating inner lengthwise edges with opposed cooperating teeth and providing a pair of jaws adapted to be moved toward and from each other in conjunction with the movement of the arms carrying said jaws, a coil spring spanning the space between the aforementioned bent portions of said arms and having outer end portions connected to median portions of the diverging ends of said arms, a toggle embodying a pair of links positioned adjacent the converging ends of said arms and having outer ends hingedly connected to the respective converging ends, said links being channel-shaped in cross-section and the inner ends thereof being adjacent to each other and hingedly joined together with the web and wall portions of the links adapted to abut each other when the links are in aligned retaining relationship, said links being situated in a position adjacent to the inner ends of the respective jaws, the convergent outer ends of said arms abutting each other when the jaws are closed, and animal-actuated trigger means embodying a pair of spaced parallel plate portions having marginal extensions straddling the abutting convergent ends of said arms, said plate portions also having spaced parallel fingers with corresponding free end portions thereof overlapping and hingedly connected to the hingedly connected inner ends of the toggle links, both of said fingers being substantially flat, one of said fingers being of a width greater than the other finger and terminating in laterally bent members serving as finger-pieces, said bent members being in a plane common with each other and spaced below the hinged inner and outer ends of said toggle links when the jaws have been sprung to assume a closed frog grappling relationship.

References Cited in the file of this patent

UNITED STATES PATENTS

| | | |
|---|---|---|
| 999,603 | Smith | Aug. 1, 1911 |
| 1,452,679 | Fisher | Apr. 24, 1923 |
| 2,579,812 | Fisher | Dec. 25, 1951 |
| 2,834,629 | Williams | May 13, 1958 |

FOREIGN PATENTS

| | | |
|---|---|---|
| 29,756 | Great Britain | Dec. 28, 1896 |